(12) United States Patent
Tillotson

(10) Patent No.: US 9,157,827 B1
(45) Date of Patent: Oct. 13, 2015

(54) TILT ELECTROLYTE SENSING FOR BATTERY HEALTH MANAGEMENT

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 13/962,162

(22) Filed: Aug. 8, 2013

(51) Int. Cl.
G01M 1/00 (2006.01)
G01M 1/12 (2006.01)

(52) U.S. Cl.
CPC ..................... *G01M 1/122* (2013.01)

(58) Field of Classification Search
CPC ........................................................ G01M 1/00
USPC ....................................................... 73/65.01
See application file for complete search history.

(56) References Cited

U.S. PATENT DOCUMENTS 5,580,675 A * 12/1996 Rouhani .......................... 429/90
2010/0121587 A1 * 5/2010 Vian et al. ....................... 702/63

\* cited by examiner

*Primary Examiner* — Lisa Caputo
*Assistant Examiner* — Jamel Williams
(74) *Attorney, Agent, or Firm* — Ostrager Chong Flaherty & Broitman P.C.

(57) ABSTRACT

Ground support equipment that makes it easier to monitor the electrochemical health of a battery. This ground support equipment is configured to implement methods for estimating the total volume and the free volume of liquid electrolyte in an electrochemical cell or in a battery containing several electrochemical cells. The methods involve measuring a center of gravity and/or a moment of inertia. The systems include ground-support equipment suitable for use in aircraft maintenance.

19 Claims, 12 Drawing Sheets

TILT ELECTROLYTE SENSING FOR BATTERY HEALTH MANAGEMENT

BACKGROUND

This disclosure generally relates generally relates to rechargeable batteries, and more specifically, to systems and methods for health management of rechargeable batteries for aerospace applications, automotive applications, and other suitable applications.

There are significant cost and maintenance challenges associated with rechargeable batteries. These challenges may impose economic concerns in a wide variety of applications. For example, in aerospace applications, unexpected battery failures may present a considerable economic impact due to system interruptions, unscheduled flight delays and cancellations, loss of capabilities, and associated costs and logistical challenges.

The general problem is to provide safe, cost-effective storage of electrical energy. In many modern aerospace products, this storage function can be best achieved using chemical batteries, such as lithium ion batteries. These batteries pose a variety of technical challenges. One challenge is monitoring the health of the battery so it can be serviced or replaced before it becomes unreliable. Ideally, it would be possible to monitor the health of a battery in situ, i.e., without removing it from its normal position such as in an airplane equipment rack. A second choice—less desirable, but acceptable—is to remove the battery from its mounting position, but not disassemble it or remove it from the airplane.

A major factor affecting the health of a battery is the amount of liquid electrolyte contained in each cell. Typical cells, such as modern lithium-ion cells, are partially filled with a liquid electrolyte. It is known that such cells can lose some of their required electrolyte, for example, due to leakage through tiny gaps in terminal seals or vent plugs. Electrolyte is a mixture of chemicals. When electrolyte leaks out, it sometimes does so as a vapor passing through a tiny passage. Smaller molecules with high vapor pressure leak out faster, leaving behind larger molecules with low vapor pressure. This changes the composition of the electrolyte, which affects its viscosity (and therefore its ionic conductivity), its heat transfer properties, its dielectric constant, and its dielectric breakdown strength. These changes all degrade the health of the battery.

It is also possible that an electrochemical cell will have extra liquid, for example, due to absorption of water from the atmosphere through tiny gaps. Moisture in the cell can lead to chemical reactions, e.g., in a lithium-ion battery, these reactions can form hydrofluoric acid that corrodes surfaces within the cell and causes it to fail. Some battery chemistries use hygroscopic electrolytes with very low vapor pressure. Leaky cells with these chemistries tend to gain mass as they absorb water from the air.

Not all changes in electrolyte level are due to leaks, and not all changes in level are bad. For example, the electrolyte level may change as the electrode degrades due to aging or cycling, so that it accommodates less electrolyte within its porous surface. This is an indication of degraded cell health, but not a leak. A typical electrode also absorbs and releases electrolyte as the cell charges or discharges. This is normal; indeed, if the electrolyte level fails to rise or fall with the state of charge, that would be an indication of degraded health. Therefore, one cannot conclude that high or low electrolyte levels indicate poor health without knowing the battery's state of charge.

A further complication is that an electrochemical cell is typically not used by itself. Cells are connected in series and/or parallel to form a battery. Opening a battery is a costly maintenance activity, so methods for monitoring battery health without opening up the battery are preferred. Assessing the health of individual cells without opening the battery is difficult. Or example, one or more of the cells may be missing liquid. The overall mass of the battery may be unchanged, however, because moisture has condensed inside the battery, or because the leaking electrolyte is trapped within the battery. Even if a maintainer can tell that at least one cell is missing liquid, the maintainer cannot tell which cell or cells has lost liquid until he or she removes each cell from the battery and tests it.

The following methods for monitoring battery health are known:

1. Weigh the battery. This approach can tell if one or more cells in the battery have lost electrolyte which has also escaped from the battery, assuming that no moisture has condensed in the battery and offset the weight loss. This method cannot determine which cells might have lost electrolyte.

2. Weigh the cells. This approach can tell if an individual cell has lost or gained liquid. This method requires opening the battery, removing every cell, and weighing each cell. This costs skilled labor time. This method cannot determine whether the electrode is capable of absorbing and releasing a healthy amount of liquid during each charge-discharge cycle.

3. Electrochemical impedance spectroscopy of the battery. This approach can reveal some aspects of battery health. If a cell has gone bad, electrochemical impedance spectroscopy (EIS) cannot tell which cell or cells in the battery have done so. The EIS equipment is typically expensive.

4. Electrochemical impedance spectroscopy of the cells. This approach can reveal some aspects of cell health. This technique requires opening the battery, removing every cell, and testing each cell. This costs skilled labor time.

5. X-ray backscatter. This approach can reveal liquid levels in each individual cell. Because x-ray backscatter equipment is large and cumbersome, this approach requires removing the battery from the vehicle and transporting it to a lab. This costs skilled labor time. The equipment has a high capital cost and poses radiation safety risks.

There is room for improving upon the above-described known methods of battery health monitoring.

SUMMARY

The measurement apparatus and processes disclosed herein can be employed to measure the level of liquid in each cell (or other cavity) in a battery, and thereby monitor the health of the battery. The result of the measurement process is information which indicates to maintenance personnel the respective levels of liquid in each cell and in the battery case. In some cases, these liquid levels can be measured without removing the battery from the airplane (or other installation) or opening the battery case. If a cell is in poor health, a measurement process can be employed to identify which cell is in poor health, so that the identified unhealthy cell can be removed and replaced rather than having to remove and test each cell separately.

Various aspects of the subject matter disclosed herein include cell-level and battery-level methods for assessing the health of a battery, and systems for implementing these methods. The systems disclosed herein include various embodiments of ground-support equipment suitable for use in monitoring the health of large batteries. The specific cell-level methods disclosed herein (for the purpose of illustration)

include methods for estimating the volume of free liquid in a cell by measuring either battery center of gravity versus tilt angle or battery moment of inertia. The specific battery-level methods disclosed herein (for the purpose of illustration) include: (1) a method for estimating cell mass (or detecting cell leaks) by measuring battery center of gravity; (2) a method for estimating free liquid in cells by measuring battery center of gravity versus tilt angle; and (3) a method for estimating free liquid in cells by measuring battery moment of inertia. The specific systems disclosed herein (for the purpose of illustration) are ground-support equipment for large batteries. The embodiments disclosed herein include the following: (1) a cart to electronically measure battery center of gravity and moment of inertia; (2) a cart to help manually measure battery center of gravity; (3) a cart to manually measure battery moment of inertia using a trifilar pendulum; and (4) a cart to manually measure battery moment of inertia using a torsional pendulum.

One aspect of the subject matter disclosed in detail herein is a method comprising: (a) measuring a weight of a battery; (b) calculating a difference of the measured weight and a nominal weight characteristic of the healthy battery of the same class as the battery whose health is being assessed; (c) if the difference of the measured weight and the nominal weight is greater than a specified tolerance, measuring a location of a center of gravity of the battery in a first dimension; and (d) calculating a location where a weight change occurred using the difference of the measured weight and the nominal weight and the measured center of gravity. The location of the center of gravity of the battery can also be measured in a second dimension. This method may further comprise testing a cell closest to the location within an area where the weight change occurred or replacing a cell closest to the location where the weight change occurred.

Another aspect of the disclosed subject matter is a method comprising: (a) measuring a first location of a first center of gravity of a battery in a first dimension when the battery has a first orientation; (b) tilting the battery from the first orientation to a second orientation different than the first orientation; (c) measuring a second location of a second center of gravity of the battery in the first dimension when the battery has the second orientation; and (d) calculating a center of gravity shift in the first dimension based on the first and second locations. The first and second locations can also be measured in a second dimension. This method may further comprise: calculating a state of charge of the battery; calculating a difference of the calculated center of gravity shift and a nominal center of gravity shift characteristic of a healthy battery of the same class and having a state of charge in the same range as the battery whose health is being assessed; and if the difference of the calculated center of gravity shift and the nominal center of gravity shift is greater than a specified tolerance, conducting further tests to locate a flawed cell inside the battery.

A further aspect is a method comprising: (a) measuring a first moment of inertia of a battery about a first axis when the battery has a first orientation; (b) calculating a state of charge of the battery; (c) calculating a difference of the measured moment of inertia and a nominal moment of inertia characteristic of a healthy battery of the same class and having a state of charge in the same range as the battery whose health is being assessed; and (d) if the difference of the measured moment of inertia and the nominal moment of inertia is greater than a first specified tolerance, conducting further tests. In one implementation, step (d) comprises: (e) tilting the battery from the first orientation to a second orientation different than the first orientation; (f) measuring a second moment of inertia of the battery about the first axis when the battery has the second orientation; (g) calculating a difference of the first and second moments of inertia; and (h) if the difference of the calculated difference of the first and second moments of inertia and a nominal difference of the first and second moments of inertia is greater than a second specified tolerance, conducting further tests. Step (h) may comprises repeating steps (a), (e), (f) and (g) using a second axis instead of the first axis.

Yet another aspect the subject matter disclosed herein is a system to assess the health of a battery, comprising a battery, at least three non-collinear vertical force sensors supporting the battery, and a processor in communication with the vertical force sensors, the processor being programmed to use data from the vertical force sensors to compute a center of gravity of the battery. This system may further comprise a platform and a tilt sensor mounted to the platform and in communication with the processor, wherein the tilt sensor is capable of measuring a tilt angle of the platform, and the vertical force sensors are disposed in a plane on the platform. Mobility of the platform is provided by a plurality of wheels and a suspension system for coupling the wheels to the platform. Optionally, the system further comprises an accelerometer or an inertial measurement unit in communication with the processor, wherein the processor is further programmed to use data from the vertical force sensors and the accelerometer or inertial measurement unit to compute a moment of inertia of the battery.

A further aspect of the subject matter disclosed herein is a cart comprising a platform, a plurality of wheels, a suspension system that couples the wheels to the platform, a frame mounted to the platform, a pendulum supported by the frame, and a battery supported by the pendulum. In one implementation, the pendulum is a torsion pendulum; in another implementation, the pendulum is a trifilar pendulum.

Yet another aspect is a method comprising the following steps: (a) establishing a nominal relationship of a free volume of liquid electrolyte versus a state of charge for a class of battery cells; (b) establishing a nominal weight for battery cells of that class; (c) weighing an in-service battery cell of that class; (d) determining a first difference between the weight and the nominal weight; (e) comparing the difference to a first specified threshold; (f) determining whether the difference is greater than the first specified threshold or not; and (g) if the difference is greater than the first specified threshold, removing the in-service cell permanently. Alternatively, if the difference is not greater than the first specified threshold, then the following additional steps are performed: (h) measuring a state of charge of the in-service battery cell; (i) determining a nominal free volume of liquid electrolyte according to the nominal relationship and the measured state of charge; (j) measuring a cell property having a value that varies as a function of a free volume of liquid electrolyte inside the in-service battery cell; (k) computing an estimated free volume of liquid electrolyte inside the in-service battery cell based on measurement of the cell property; (l) determining a difference between the estimated free volume and the nominal free volume of liquid electrolyte; (m) comparing the difference between the estimated free volume and the nominal free volume to a second specified threshold; and (n) if the difference between the estimated free volume and the nominal free volume is greater than a second specified threshold, removing the in-service battery cell permanently or until further tests can be performed. The measured cell property may be center of gravity or moment of inertia.

Other aspects of systems and methods for monitoring battery health are disclosed below.

BRIEF DESCRIPTION OF THE DRAWINGS

Reference will hereinafter be made to the drawings in which similar elements in different drawings bear the same reference numerals.

DETAILED DESCRIPTION

Figures 1A, 1B:
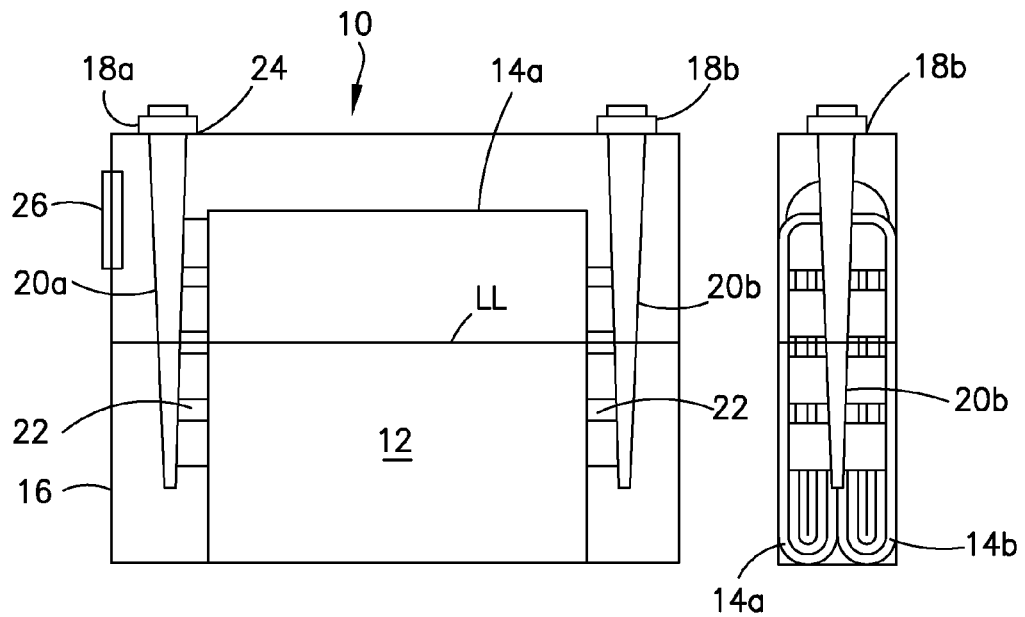
FIGS. 1A and 1B are diagrams showing front and side views of an electrochemical cell of a type having liquid electrolyte and "jellyroll" electrodes. For the purpose of illustration, the walls of the cell are depicted as being transparent and of infinitesimally small thickness.

FIGS. 1A and 1B are diagrams showing front and side views of a typical lithium-ion cell 10 partially filled with liquid electrolyte 12 and having a pair of "jellyroll" electrodes 14a and 14b. For the purpose of illustration, the walls of the cell case 16 are depicted as being transparent and of infinitesimally small thickness. Cell 10 has a pair of terminals 18a and 18b which are respectively electrically connected to electrodes 14a and 14b by means of respective connectors 20a and 20b and a multiplicity of tabs 22. As depicted in FIG. 1A, the lithium-ion cell is partially filled with a liquid electrolyte 12 to a liquid level LL. It is known that such cells can lose some of their required electrolyte, for example, due to leakage through tiny gaps in terminal seals 24 or cell vent plugs 26.

Figure 2:
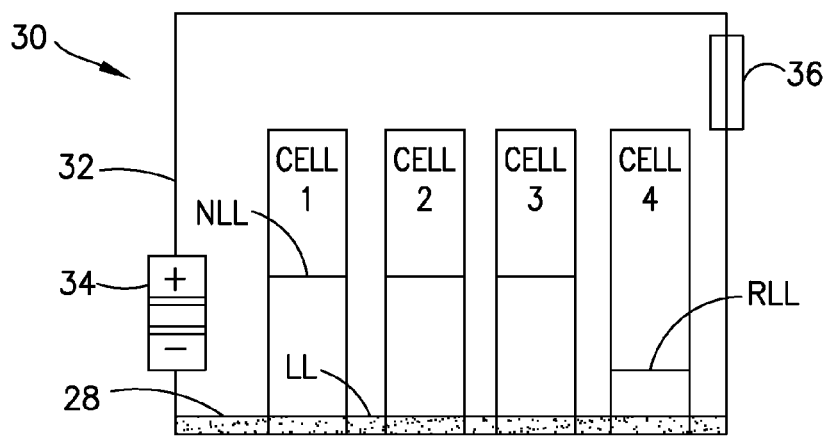
FIG. 2 is a schematic representation (end view) of a plurality of cells arranged inside a battery case that contains liquid (e.g., condensed water).

Cells are connected in series and/or parallel to form a battery. FIG. 2 is a schematic representation (end view) of four cells (cells 1-4) arranged inside a battery case 32 of a battery 30. The battery case 32 supports a battery connector 34 and battery vent plug 36. In the scenario represented in FIG. 2, cells 1-3 have a normal liquid level NLL; cell 4 has a reduced liquid level RLL (i.e., lower than the normal level); and the battery case 32 contains liquid 28 (e.g., condensed water, indicated by shading), having a liquid level LL. Such a scenario could occur due to electrolyte leaking out of cell 4 but remaining inside the battery case 32.

The electrochemical health of a battery, such as the battery schematically depicted in FIG. 2, should be periodically monitored. Various embodiments of cell-level and battery-level methods for measuring battery health will now be described for the purpose of illustration. Following detailed description of those methods, associated systems for implementing the disclosed methods will be described in detail.

Methods that Measure Cell CG Shift v. Tilt Angle

In accordance with the one embodiment, the free liquid in each cell is measured by tilting the cell and measuring changes in center of gravity (CG) as a function of tilt angle.

Figure 3C:
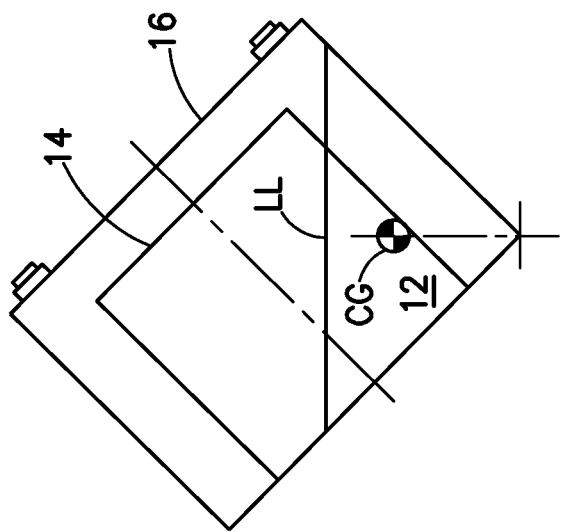
FIGS. 3A-3C are schematic representations (front views) of a cell in three tilting states: not tilted (FIG. 3A); tilted at a small angle (FIG. 3B); and tilted at a relatively larger angle (FIG. 3C). The small circle with two black quadrants and two white quadrants represents the center of gravity (CG) of the liquid, which moves as the tilt angle changes.
Figure 3B:
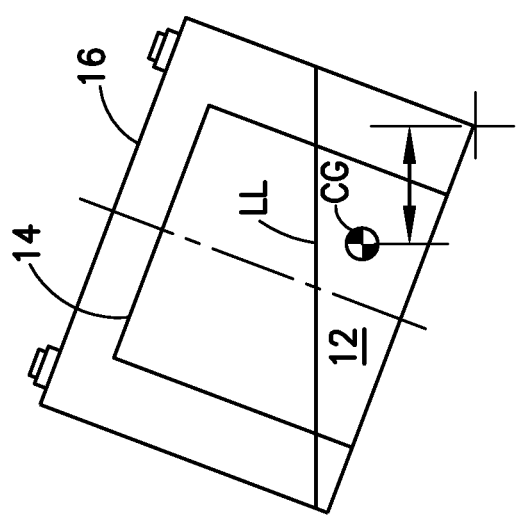
Figure 3A:
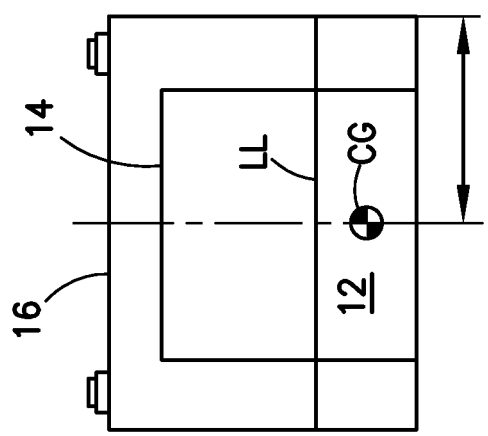

FIGS. 3A-3C are schematic representations (front views) of a cell 10 in three tilting states: not tilted (FIG. 3A); tilted at a small angle (FIG. 3B); and tilted at a relatively larger angle (FIG. 3C). The small circle with two black quadrants and two white quadrants represents the center of gravity (CG) of the liquid electrolyte 12, which moves as the tilt angle changes. The cell has two jellyroll electrodes 6, only one of which is visible in FIGS. 3A-3C.

In FIG. 3A, the cell 10 is resting level to the ground. Liquid electrolyte has an upper surface (i.e., liquid level LL) that is parallel with the top surface 38 and bottom surface 40 of the cell 10. The CG of the liquid electrolyte 12 is aligned with the central axis of the cell 10, indicated by a dash-dot line which bisects the cell 10 vertically. In FIG. 3B, the cell 10 is tilted about 20°. As a result, the CG of the liquid electrolyte 12 has moved to the right relative to the cell's axis and slightly farther from the cell's bottom surface 40. In FIG. 3C, the cell 10 is tilted about 45°. As a result, the CG of the liquid electrolyte 12 has moved much farther to the right and farther from the cell's bottom surface 40.

Figure 4:
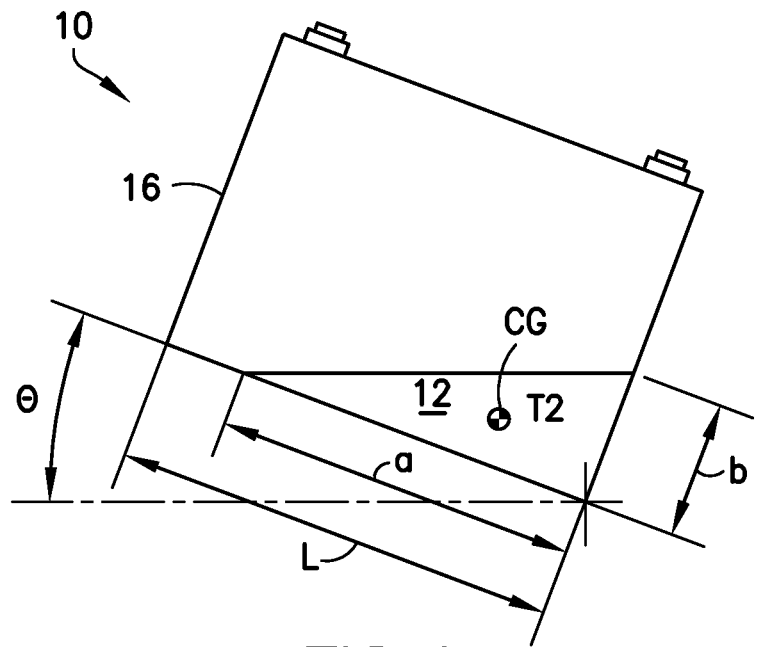
FIG. 4 is a schematic representation (front view) of a cell of length L tilted at an angle θ. The cell is partially filled with liquid so that it occupies a volume having a triangular profile.

By measuring the CG of a cell versus its tilt angle and using knowledge of the cell's geometry, it is possible to estimate the amount of free liquid in the cell. (Liquid that is unable to move, such as electrolyte trapped in pores within the electrode, is "bound", not free.) FIG. 4 shows an example for a rectangular cell 10, tilted at a tilt angle θ, that contains a relatively small amount of free liquid electrolyte 12. The cell's length is L. The liquid volume is V0 and its projected area is A0 (visible in FIG. 4 but not labeled). The volume and area are related by the thickness t of the cell (into the page):

$$V0 = t\, A0. \quad (1)$$

At tilt angle θ, the liquid electrolyte 12 occupies the triangular region T2. The lengths of the triangle's non-hypotenuse sides, a and b, are related by:

$$b = a \tan(\theta). \quad (2)$$

T2's area A0 can be computed using principles of plane geometry:

$$A0 = \frac{1}{2} ab = \frac{1}{2} a^2 \tan(\theta) \quad (3)$$

so $$a = \sqrt{\frac{2A0}{\tan(\theta)}} \quad (4)$$

$$b = \sqrt{2A0 \tan(\theta)} \quad (5)$$

For liquid with uniform density, the liquid's CG is at the centroid of T2, which is given by the mean of T2's vertices. Let the origin (0, 0) be the lower corner of the cell, which is marked with a dot-dash crosshair in FIG. 4. That corner is one vertex of T2. Then x-coordinates of the other two vertices are −a cos(θ) and b sin(θ). The CG of T2 in the x-direction is therefore:

$$GC\_T2 = \frac{-a\cos(\theta) + b\sin(\theta) + 0}{3}$$

$$= \frac{-\sqrt{\frac{2A0}{\tan(\theta)}} \cos(\theta) + \sqrt{2A0 \tan(\theta)} \sin(\theta)}{3}$$

$$= \sqrt{A0}\, \frac{\left[-\sqrt{\frac{2}{\tan(\theta)}} \cos(\theta) + \sqrt{2\tan(\theta)} \sin(\theta)\right]}{3}. \quad (6)$$

Thus, given a measurement of the CG at a tilt angle θ, and compensating for the fixed CG of the rigid parts of the cell, we can solve for A0:

$$A0 = \left( \frac{3 \times CG\_T2}{-\sqrt{\frac{2}{\tan(\theta)}} \cos(\theta) + \sqrt{2\tan(\theta)} \sin(\theta)} \right)^2 \quad (7)$$

from which we can use Eq. (1) to compute V0.

Figure 5:
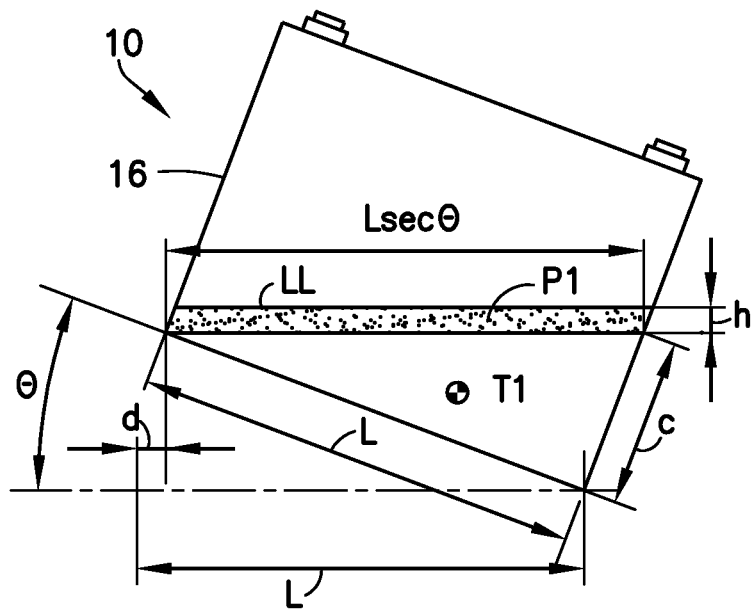
FIG. 5 is a schematic representation (front view) of a cell of length L tilted at an angle θ. The cell is partially filled with liquid so that it occupies a first volume having a triangular profile and a second volume having a parallelogram profile.

Referring now to FIG. 5, for larger volumes of liquid or for different tilt angles, the liquid electrolyte 12 not only fills a triangular region T1, but also a parallelogram region P1 (indicated by shading). A0 is the sum of areas A_T1 and A_P1:

$$A0 = A\_T1 + A\_P1 \quad (8)$$

Those respective areas can be computed by principles of plane geometry:

$$A\_T1 = \frac{L^2 \tan(\theta)}{2} \quad (9)$$

$$A\_P1 = hL\sec(\theta) \quad (10)$$

The CGs of regions T1 and P1 are given by the means of their vertices. The CGs' x-coordinates are:

$$CG\_T1 = \frac{-L\cos(\theta) + L\tan(\theta)\sin(\theta) + 0}{3} \quad (11)$$

$$CG\_P1 = \frac{-L\cos(\theta) + (L\sin(\theta) + h)\tan(\theta)}{2}. \quad (12)$$

The overall CG of the liquid electrolyte 12 is the weighted average of the two CGs:

$$Overall\_CG = \frac{A\_P1 \times CG\_P1 + A\_T1 \times CG\_T1}{A\_P1 + A\_T1}. \quad (13)$$

Thus, given measurements of the CG at a tilt angle θ, and compensating for the fixed CG of the rigid parts of the cell and bound liquid, one can solve for A0, from which one can compute V0, the volume of free liquid. However, Eq. (13) is a third-degree (cubic) equation in the unknown quantity h, so solving for A0 is harder than for Eq. (7). Successive approximations or graphical methods may be used, and multiple measurements of CG at various tilt angles may be needed.

Figure 6:
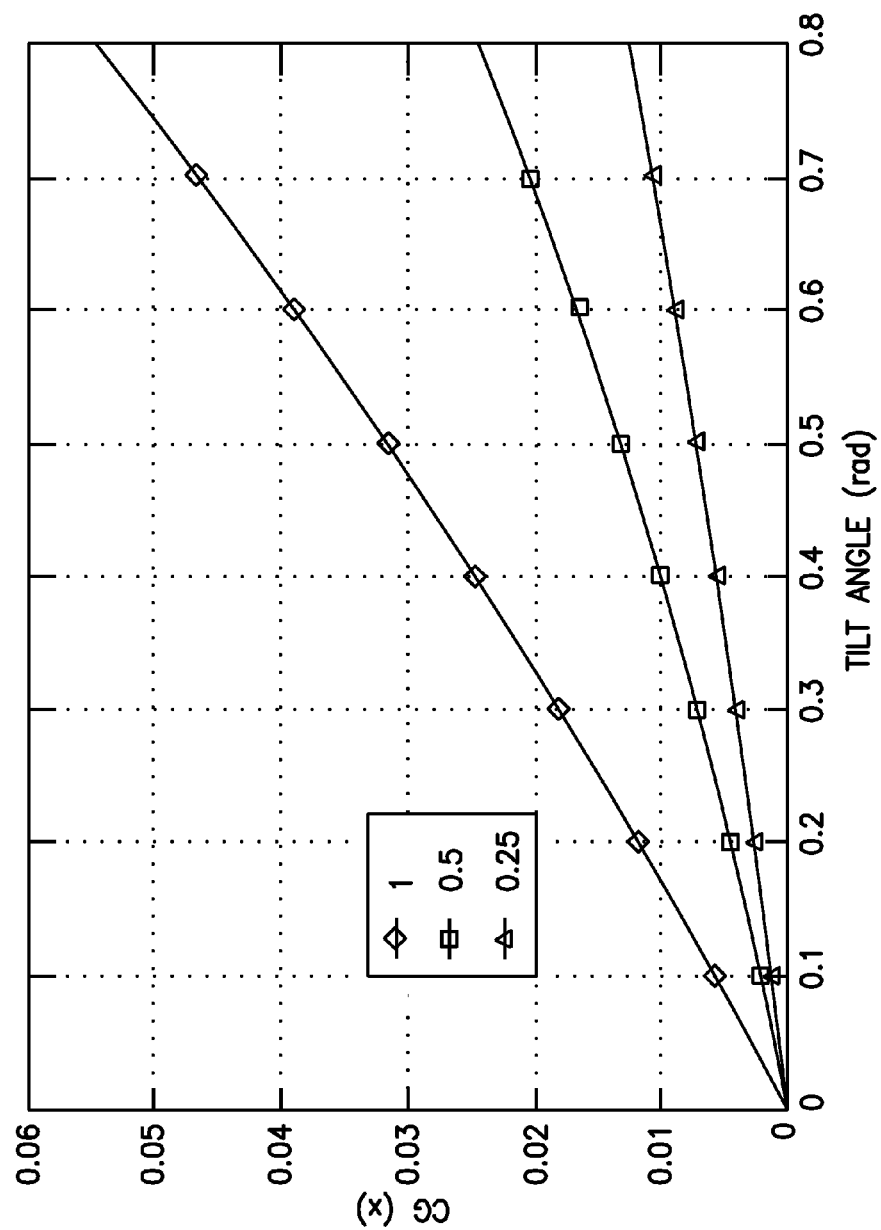
FIG. 6 is a graph showing three curves corresponding to respective volumes of free liquid in a cell. The horizontal axis is tilt angle relative to the cell's normal orientation. The vertical axis is the distance the CG shifts from its normal position during tilting.

Given the tilt angle θ and CG, one can compute the volume of liquid electrolyte 12 using the formulas above. For more complex geometry, or for quick use in the field, one can use a curve, such as the curve shown in FIG. 6, to estimate the volume of free liquid electrolyte 12 in a cell 10. The horizontal axis is tilt angle relative to the cell's normal orientation. The vertical axis is the distance the cell CG shifts from its normal position during tilting. Each curve corresponds to a volume of free liquid in the cell. These curves can be computed from formulas like those in Eqs. (6) and (13), including an "if" statement to determine whether the free liquid inside the cell corresponds to the triangle-only case of FIG. 4 or the triangle-plus-parallelogram case of FIG. 5. For embodiments dealing with different cell geometries, the computations would be different. In some embodiments, the curves are not computed, but are physically measured by filling representative cells with different volumes of electrolyte, tilting the cells at various tilt angles, and measuring the resulting CG shift. Solving for the volume of liquid from a given tilt angle and CG may be done by a computational lookup table, by solving an equation that represents a best-fit to measured curves, or by graphically plotting coordinates on a plot similar to FIG. 6.

In accordance with some embodiments or applications, users can measure CG at multiple tilt angles to improve the precision of a free volume estimate.

Knowing the volume V0 of free liquid in the cell is not sufficient to assess cell health. One must compare the measured V0 to the expected V0 for a cell that is charged as much as the cell being measured. Thus the measurement process would be as follows: (1) establish the nominal cell weight and nominal V0 versus the state of charge for a class of cells; (2) measure cell weight, CG, and state of charge for an in-service cell of that class; and (3) using the method described above (or an equivalent method), compute V0; (4) if V0 is far outside the expected range for the measured state of charge, flag the cell as unusable; and (5) if V0 is only slightly outside the expected range, flag the cell as needing further testing, e.g., EIS.

Thresholds for testing or discarding cells depend on the type of cell (e.g., NiCd or Li-ion), the required cell performance, and the application's relative emphasis on cost versus reliability in service.

Methods that Measure Cell Moment of Inertia

Figure 7A:
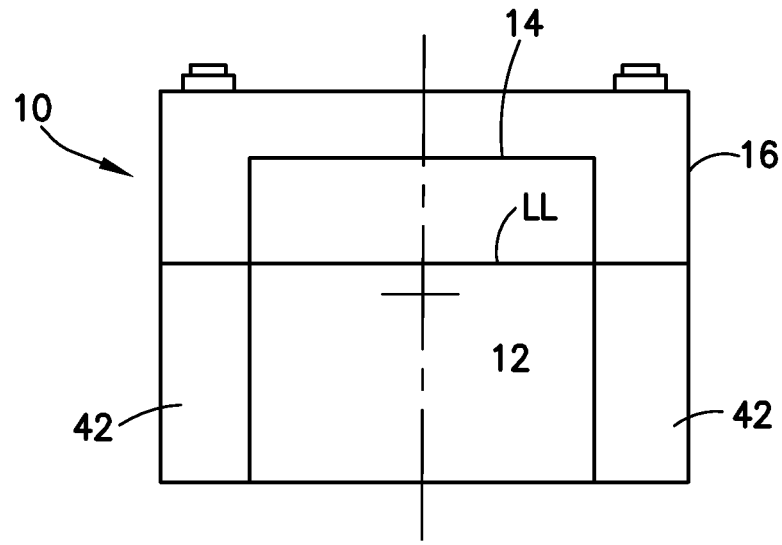
FIGS. 7A and 7B are schematic representations (front view) of respective cells having different distributions of liquid electrolyte, resulting in different moments of inertia.
Figure 7B:
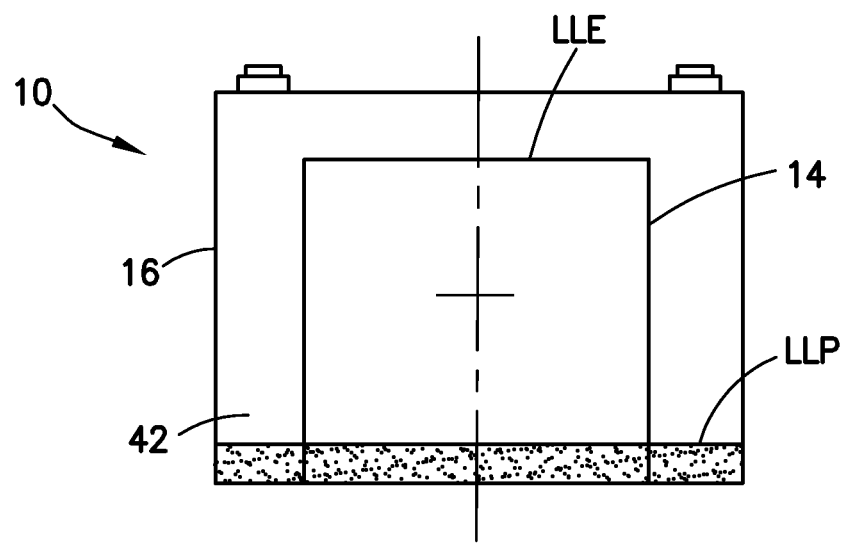

An alternative method uses the cell's moment of inertia, not its center of gravity, to assess the distribution of liquid in a cell. The formula for moment of inertia for a point mass about a specified axis is:

$$I = mr^2 \quad (14)$$

where m is mass and r is the distance of the point mass from the axis of rotation, measured along a line perpendicular to the axis. FIG. 7A shows a cell 10 in which all of the liquid electrolyte 12 is at the same level LL: the bound liquid is equally high in the "jellyroll" electrode 14 as the free liquid is in the plenum 42 at the sides of the case. FIG. 7B shows a cell 10 in which the cell's liquid electrolyte 12 rises higher in the jellyroll electrode 14 near the cell's vertical axis to a liquid level LLE, and the free liquid (indicated by shading) is therefore depleted and at a liquid level LLP in the plenum 42 at each side. Measuring the cell's mass and its moment of inertia about the vertical axis reveals the distribution of liquid electrolyte 12 within the cell 10, particularly the volume V0 of free liquid. As with the CG method, V0 alone is not sufficient to assess cell health; V0 must be compared to its expected value for the cell's state of charge.

In view of the foregoing, one exemplary method for measuring the health of a battery cell comprises the following steps: (a) establishing a nominal relationship of a free volume of liquid electrolyte versus a state of charge for a class of battery cells; (b) establishing a nominal weight for battery cells of that class; (c) weighing an in-service battery cell of that class; (d) determining a first difference between the weight and the nominal weight; (e) comparing the difference to a first specified threshold; (f) determining whether the difference is greater than the first specified threshold or not; and (g) if the difference is greater than the first specified threshold, removing the in-service cell permanently. Alternatively, if the difference is not greater than the first specified threshold, then the following additional steps are performed: (h) measuring a state of charge of the in-service battery cell; (i) determining a nominal free volume of liquid electrolyte according to the nominal relationship and the measured state of charge; a) measuring a cell property having a value that varies as a function of a free volume of liquid electrolyte inside the in-service battery cell; (k) computing an estimated free volume of liquid electrolyte inside the in-service battery cell based on measurement of the cell property; (l) determining a difference between the estimated free volume and the nominal free volume of liquid electrolyte; (m) comparing the difference between the estimated free volume and the nominal free volume to a second specified threshold; and (n) if the difference between the estimated free volume and the nominal free volume is greater than a second specified threshold, removing the in-service battery cell permanently or until further tests can be performed. The measured cell property may be center of gravity or moment of inertia.

Methods that Measure Battery CG Shift

Figure 8:
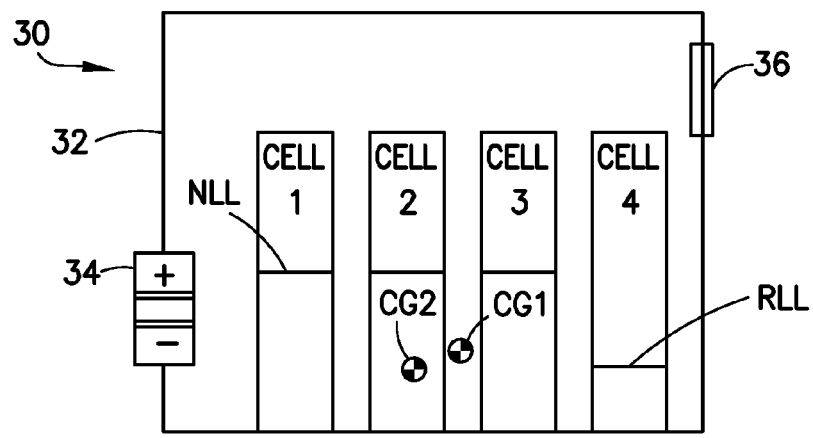
FIG. 8 is a schematic representation (end view) of a battery that has three cells (cells 1-3) with normal liquid levels and one cell (cell 4) with a reduced liquid level. The symbol labeled CG1 indicates the normal center of gravity of the battery (i.e., when all cells have normal liquid levels), while the symbol labeled CG2 indicates a shift in center of gravity of the battery due to the reduced liquid level in cell 4.

Thus far, measurements on single cells have been described. These require the user to remove a battery from its mount and to remove cells from the battery. Alternative methods can be employed to avoid this labor cost. One method uses CG measurements of a whole battery. FIG. 8 is a schematic representation (end view) of a battery 30 that has three cells (cells 1-3) with normal liquid level NLL and one cell (cell 4) with a reduced liquid level RLL due to the loss of some electrolyte. The symbol labeled CG1 indicates the normal center of gravity of the battery (i.e., when all cells have normal liquid levels), while the symbol labeled CG2 indicates a shift in center of gravity of the battery due to the reduced liquid level in cell 4. Weighing the battery will enable a user to determine that some electrolyte is missing, but will not enable the user to determine which cell (or cells) has lost electrolyte.

To determine which cell is leaking, the CG of the battery is measured. If no cells have lost electrolyte, the battery's CG is in its nominal location near the center of the battery, marked as CG1 in FIG. 8. (The nominal CG can be measured in new batteries that are known to be correct, or it can be computed from a geometric model of the battery.) If the far-right cell 4 has lost an amount of electrolyte as shown—which is measured by weighing the battery 30—the CG (marked as CG2 in FIG. 8) shifts to the left. (Obviously if viewed from behind, the shift would be to the right.) If instead the center-right cell 3 loses the same amount of liquid electrolyte, the CG would shift to the left by a smaller distance. If the center-left cell 2 loses liquid electrolyte, then the CG shifts slightly to the right, and if the far-left cell 1 loses electrolyte, the CG shifts farther to the right. Thus, the measurement process for determining the shift in battery CG is as follows: (1) establish the nominal battery weight and CG for a class of batteries; (2) measure the weight of an in-service battery; (3) if the battery has gained or lost enough weight to be a concern, measure its CG; (4) use the measured weight change and the CG to compute a location within an area where the weight change must have occurred (the centroid of a volume is used as the effective location of the volume; for convex-shaped volumes, the centroid is always inside the volume, so the location of the centroid can unambiguously identify the cell where the weight change has occurred); and (5) test or replace the cell closest to that location.

Figure 9:
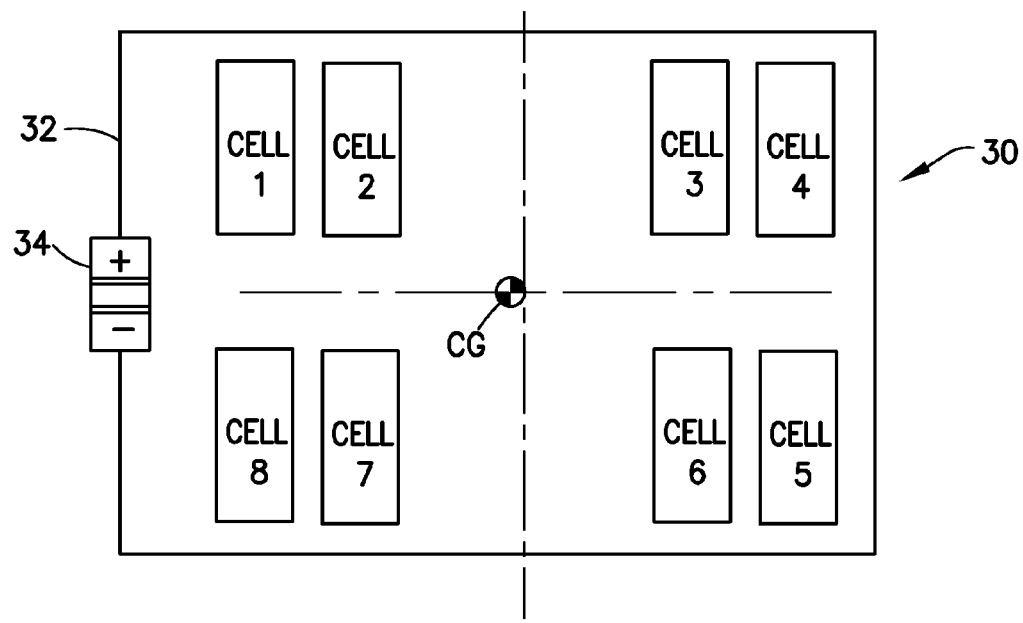
FIG. 9 is a schematic representation (top view) of a battery that has eight cells (cells 1-8) in a two-dimensional arrangement. The symbol labeled CG indicates a center of gravity of the battery which has been shifted relative to the nominal CG location (indicated by the intersection of two mutually perpendicular dash-dot lines).

The situation illustrated in FIG. 8 has the cells arranged linearly in the battery and a one-dimensional shift in CG occurred along the x-axis when one cell lost liquid electrolyte. (The shift shown in the FIG. 8 has some vertical displacement, which was ignored in the above discussion.) However, CG can be measured as a three-dimensional position. If the cells are arranged in a two-dimensional arrangement as shown in FIG. 9 or even in a three-dimensional arrangement, maintenance personnel can weigh the battery, measure its CG location in two or three dimensions, and determine the shift of the measured CG location from the nominal CG location (indicated by the intersection of two mutually perpendicular dash-dot lines in FIG. 9) to determine which single cell has lost or gained liquid.

The method described above with reference to FIGS. 8 and 9 works when a cell has lost or gained mass. As noted earlier, however, an aging or damaged cell may have the correct mass, yet have more or less free liquid electrolyte than a healthy cell for a given state of charge. A scenario of this type can be detected by measuring the battery's CG shift versus tilt angle or by measuring the battery's moment of inertia.

Methods that Measure Battery CG Shift v. Tilt Angle

The method previously disclosed in the context of measuring the CG shift of a single cell removed from a battery and then tilted at different tilt angles can also be used to measure free liquid in cells inside a battery that has the correct total mass. To do so, the battery is tilted to different tilt angles, which tilts all the cells. Their CGs shift by a distance that depends on the volume of free liquid in each cell. This shifts the overall CG of the battery by an amount that is computable from the battery's composition and geometry. If the amount of CG shift is not within acceptable bounds for the battery's state of charge, further testing is performed to locate the flawed cell. The state of charge of the battery may be determined using any known methodology, including but not limited to the methodology disclosed in U.S. Published Patent Application No. 2010/0121587, the disclosure of which is incorporated by reference herein in its entirety. The basic principle is the same for the battery-level method as for the cell-level method. There is an amount $V_0$ of free liquid in the battery, which is distributed among multiple cells, such as volumes $V_1$, $V_2$, etc. By calculation or by experimentation, maintenance personnel can deduce how much the battery CG shifts at each tilt angle when the volume $V_0$ is within the healthy range for a given state of charge; if the measured CG shift is outside that range, then it is known that $V_0$ has an unhealthy value.

Methods that Measure Battery Moment of Inertia

Figure 10:
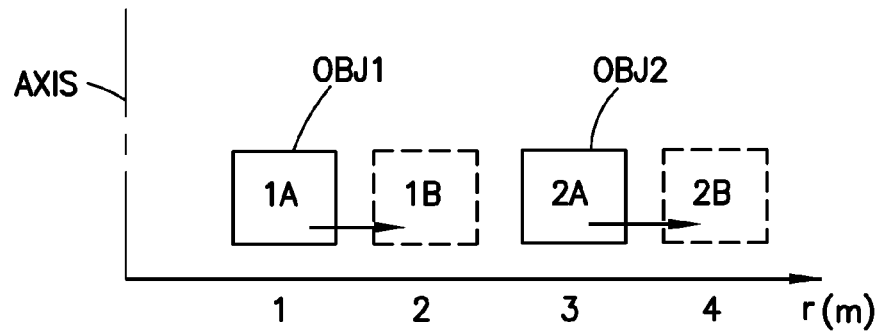
FIG. 10 is a graph showing the effects on moment of inertia measured about a vertical axis when two objects located at different distances from the vertical axis are shifted by the same distance.

FIG. 10 is a graph showing the effects on moment of inertia measured about a vertical axis (indicated by a dashed line) when two objects (respectively labeled OBJ1 and OBJ2) located at different distances r (measured in meters) from the vertical axis are shifted by the same distance (indicated by respective arrows). Object OBJ1 and object OBJ2 (referred to later as a "system") are assumed to have the same mass M (kg). Shifting object OBJ1 from position 1A (r=1 m) to position 1B (r=2 m) changes the location of the system's CG from $$CG_A = \frac{\sum M_i r_i}{\sum M_i} = \frac{M(1+3)}{M+M} = 2Mm \quad (15)$$

to $$CG_{BB} = \frac{M(2+3)}{M+M} = \frac{5}{2}Mm, \quad (16)$$

a change of M/2 m. Shifting object OBJ2 from position 2A (r=3 m) to position 2B (r=4 m) changes the location of the system's CG by the same distance. However, these equal-distance shifts in CG change the moment of inertia [defined in Eq. (14)] by different amounts. For object OBJ1:

$$\Delta I_1 = M(r_2^2 - r_1^2) = M(2^2 - 1^2) = 3 \text{ M kg-m}^2 \quad (17)$$

while for object OBJ2:

$$\Delta I_2 = M(4^2 - 3^2) = 7 \text{ M kg-m}^2. \quad (18)$$

In accordance with one method for assessing the health of an in-service battery, the moment of inertia of the in-service battery can be measured and then the measured moment of inertia is compared to a healthy value, i.e., a nominal moment of inertia characteristic of a class of batteries to which the in-service battery belongs. At a minimum, this tells maintenance personnel whether the battery is healthy. If it is not, additional measurements of some type can be performed to determine which cell has a problem. For example, the moments of inertia can be measured when the battery has two different orientations and then the difference in moments of inertia is compared to a healthy value. This gives additional information and is one way to ascertain which cell has a problem. The state of charge of the battery is also factor. The state of charge affects the distribution of liquid in a healthy battery, so the state of charge will also be measured. In summary, if the magnitude of the difference of the measured moment of inertia and the nominal moment of inertia is not within acceptable bounds for the battery's state of charge, further testing is performed to locate the flawed cell. In particular, the effect of mass displacement on the moment of inertia of a system can be used to locate a cell that has the correct total mass of liquid, but too much or too little free liquid.

Figure 11:
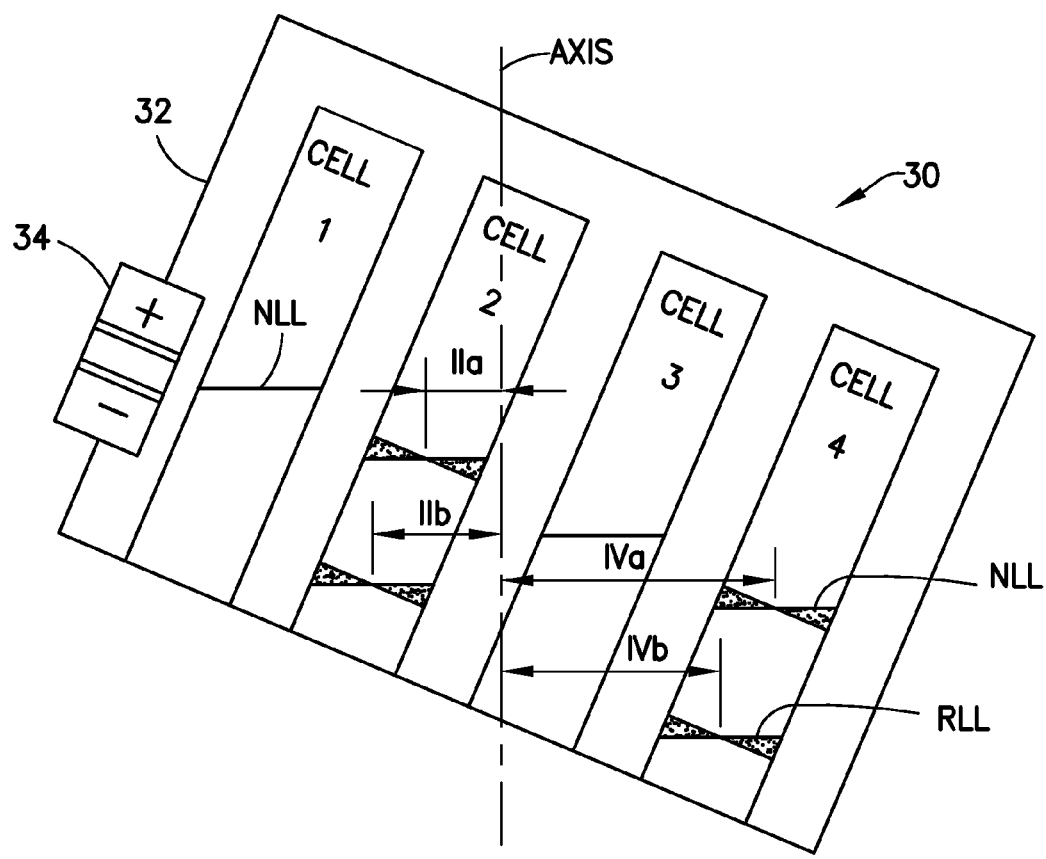
FIG. 11 is a schematic representation (end view) of a battery that has four cells (cells 1-4) and is tilted at a tilt angle. Cells 1 and 3 each have a normal liquid level NLL, while cells 2 and 4 each have a reduced liquid level RLL. The normal liquid levels in cells 2 and 4 are indicated by dashed lines.

FIG. 11 is a schematic representation (end view) of a battery 30 that has four cells (cells 1-4) and has been tilted at a tilt angle. Cells 1 and 3 each have a normal liquid level NLL, while cells 2 and 4 each have a reduced liquid level RLL. The normal liquid levels in cells 2 and 4 are indicated by dashed lines. When the battery 30 is tilted, free liquid in each cell flows to keep the liquid's top surface level. Gray triangles in cells 2 and show the resulting displacement of a small mass of liquid, in, in two situations: when the liquid level is normal and when the liquid level is reduced. (Similar displacements when the liquid level is normal in cells 1 and 3 are not shown.) This displacement of mass shifts each cell's CG to the right, and therefore the battery's CG also shifts to the right. If one of the cells has too little free liquid, the CG shifts by a different amount, but that amount is the same regardless of which cell has the problem. However, tilting the battery changes not only its CG, but also its moment of inertia about the battery axis (indicated by a dash-dot line). The magnitude of this change, $\Delta I$, depends on whether all cells have the normal volume of free liquid.

If cell 2 has the normal amount of free liquid electrolyte (indicated by dashed line NLL), then the liquid electrolyte in cell 2 shifts from a distance slightly greater than r=IIa to a distance slightly less than r=IIa. If the shift distance is e, then the resulting change in moment of inertia is:

$$\Delta I = m((IIa+\epsilon)^2 - (IIa-\epsilon)^2) = 4m\epsilon IIa \quad (19)$$

If cell 2 has too little free liquid electrolyte (indicated by solid line RLL), then the liquid electrolyte in cell 2 shifts from a distance slightly greater than r=IIb to a distance slightly less than r=IIb. The resulting change in moment of inertia is:

$$\Delta I = m((IIb+\epsilon)^2 - (IIb-\epsilon)^2) = 4m\epsilon IIb \quad (20)$$

Since distance IIb>IIa, the value of $\Delta I$ when cell 2 has too little liquid electrolyte is larger than its "healthy" value.

On the other hand, when cell 4 has too little liquid, $\Delta I$ is smaller than the healthy value because distance IVb<IVa. Thus, measuring I about an axis, tilting the battery to a new orientation, and measuring the change $\Delta I$ in moment of inertia about the same axis tells the user: (a) whether at least one cell has too little liquid and, if so, by how much (proportional to the absolute difference of measured $\Delta I$ and the healthy $\Delta I$); and (b) which side of the axis the cell is on (determined by the sign of the difference of measured $\Delta I$ and the healthy $\Delta I$). Choosing a new axis closer to the bad cell and repeating the process gives a second reference from which to determine which side the cell is on. This process is repeated in a binary search until the user can determine which cell is bad.

Figure 12A:
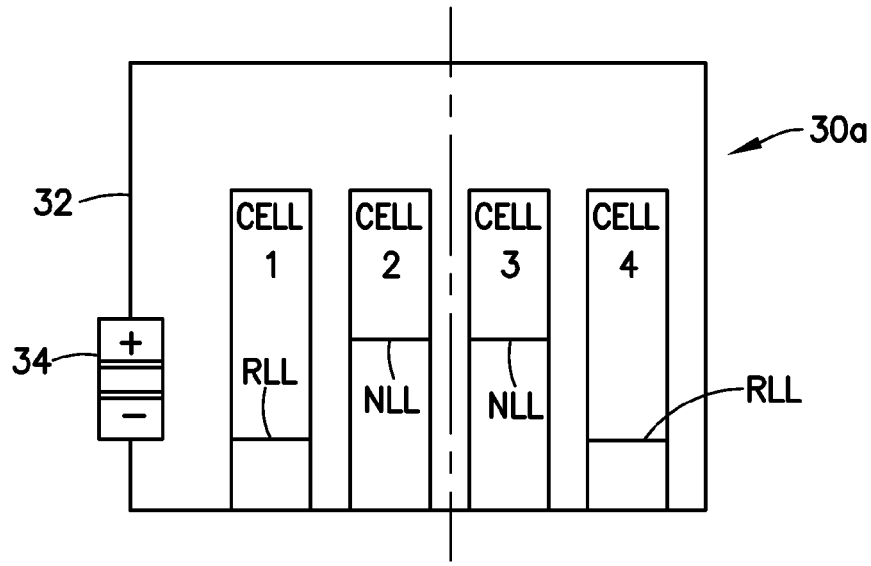
FIGS. 12A and 12B are schematic representations (end views) of respective batteries that have four cells, two with normal liquid levels and two with reduced liquid levels. In one battery, cells 1 and 4 have reduced liquid levels (see FIG. 12A); in the other battery, cells 2 and 3 have reduced liquid levels (see FIG. 12B).
Figure 12B:
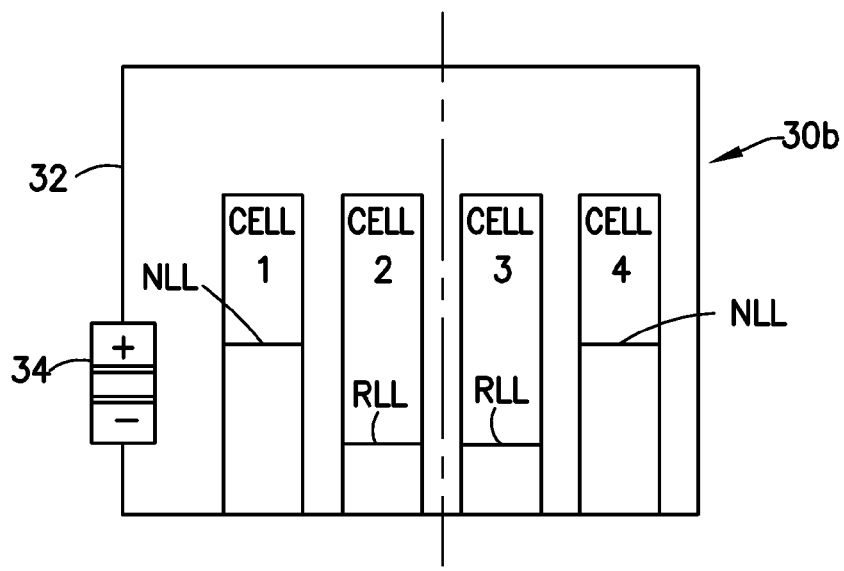

In some cases, more than one cell might gain or lose electrolyte, causing a CG measurement to give ambiguous results. One reason for ambiguity will now be explained with reference to FIGS. 12A and 12B, which are schematic representations (end views) of respective batteries 30a and 30b that each have four cells, two with normal liquid levels NLL and two with reduced liquid levels RLL. In battery 30a (see FIG. 12A), cells 1 and 4 have lost electrolyte. Cells 1 and 4 are at balanced locations (i.e., symmetric about the axis), so the battery's CG does not change as a result of lost electrolyte. In battery 30b (see FIG. 12B), cells 2 and 3 have lost electrolyte. Cells 2 and 3 are also at balanced locations, so the battery's CG does not change. (This is just an example. One could use examples where the CG does change, but by less than if the measured weight change were entirely within a single cell.)

The method disclosed herein for measuring changes in the moment of inertia of the battery about a vertical axis (shown by the dot-dash line in FIGS. 12A and 12B) can be used to distinguish these cases. Since battery 30a seen in FIG. 12A has most of its mass near the axis and battery 30b seen in FIG. 12B has most of its mass far from the axis, the lower battery has larger moment of inertia. Given a battery weight and an ambiguous CG measurement, the moment of inertia will not tell a user exactly which cells have how much liquid, but it will give the user useful guidance on which cells to test first, thereby reducing the costs associated with battery health management.

Apparatus for Implementing the Disclosed Methods

Various embodiments of systems for implementing the above-described methods will now be described at a high level, leaving out detailed description of individual commercially available components which have well-known internal structure and principles of operation.

Figure 13A:
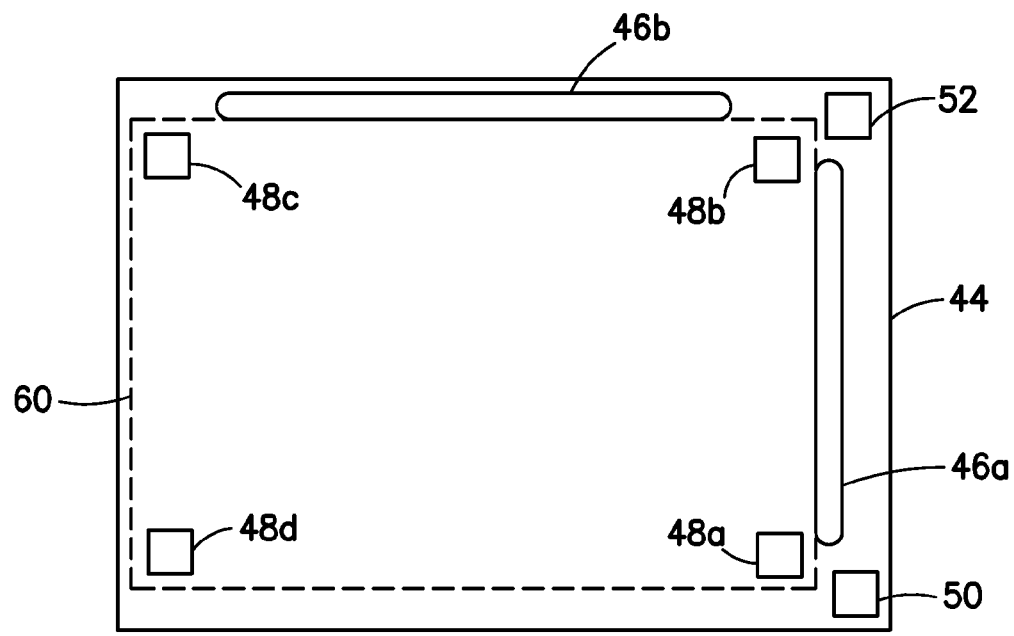
FIGS. 13A and 13B are schematic representations (top and side views respectively) of one embodiment of a portable electronic maintenance cart capable of computing a battery's weight, CG and moment of inertia using measurement data from various sensors.
Figure 13B:
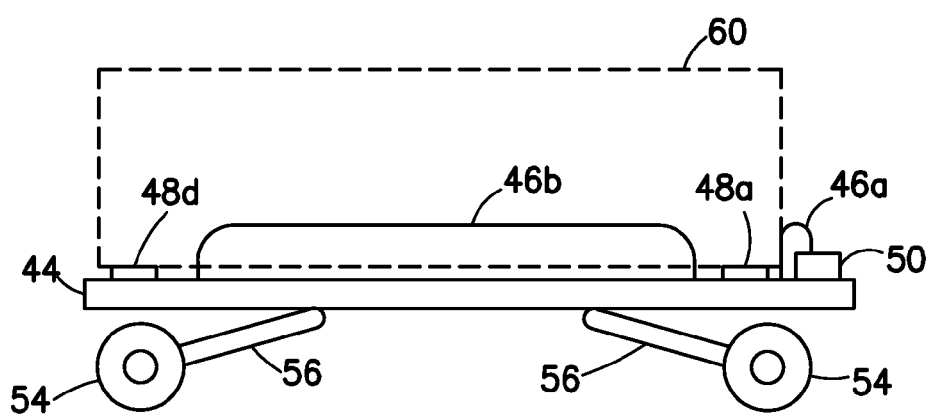

FIGS. 13A and 13B are schematic representations (top and side views respectively) of one embodiment of a portable electronic maintenance cart capable of computing a battery's weight, CG and moment of inertia using measurement data from various sensors. The cart comprises a platform 44 that is coupled to a set of four wheels 54 (only two wheels are visible in FIG. 13B) by means of a suspension system 56. The onboard sensors include four vertical force sensors 48a through 48d arranged at the four corners of a rectangle, and a tilt sensor and accelerometer unit 50. Although four vertical force sensors are depicted in FIG. 13A, three vertical force sensors would be sufficient for making weight and CG measurements. These sensors communicate with a data processing system 52 (comprising a CPU, memory for data storage, and a datalink) by way of electrical connections not shown. The CPU of data processing system 52 processes the sensor data, stores it in memory, and sends it to a workstation at an operations command center (not shown), for example, by means of a wireless datalink communications channel.

The tilt sensor of unit 50 allows the user or the CPU of data processing system 52 to verify that the cart is level when reference CG measurements are being made. To make CG measurements at various tilt angles with a simple version of the cart, the user manually tilts the cart (aided by the cart's flexible suspension system 56), and the tilt sensor of unit 50 measures the tilt angle while the force sensors 48a-48d and the CPU of system 52 make weight and CG measurements. A more complex cart can be provided with electromechanical actuators (not shown) so that the cart can tilt itself during these measurements. Stops or bumpers 46a and 46b disposed along respective mutually perpendicular edges of the platform 44 provide solid position references so the battery's position (indicated by dashed rectangle 60 in FIG. 13A) is known during the CG measurements.

The cart depicted in FIGS. 13A and 13B can also be used to measure moments of inertia. The first step is to rock the cart, whether by built-in actuators or by the user manually pushing it back and forth. The tilt sensor and the accelerometer of unit 50 measure linear acceleration and angular acceleration of the cart's platform 44. The vertical force sensors 48a-48d measure the force at each point where the cart's platform interacts with the battery (not shown in FIGS. 13A and 13B, but the space occupied by the battery is indicated by dashed rectangles 60). The CPU of data processing system 52 uses these sensor inputs to compute: (a) the torque exerted about each axis of the battery; and (b) the battery's angular acceleration about each axis. It then uses the torque and angular acceleration values to compute each moment of inertia, I, which is the ratio of torque about an axis to the angular acceleration about the same axis.

A cart is useful as ground-support equipment for aircraft: it does not add weight to an aircraft, and it can be used to move a heavy battery in and near an airplane. However, the system of at least three vertical force sensors, together with a local tilt sensor and accelerometer (or an inertial measurement unit) can be built into a vehicle's battery mount and used to measure a battery's CG and—when the vehicle rotates about its axes—the battery's moments of inertia.

Figure 14A:
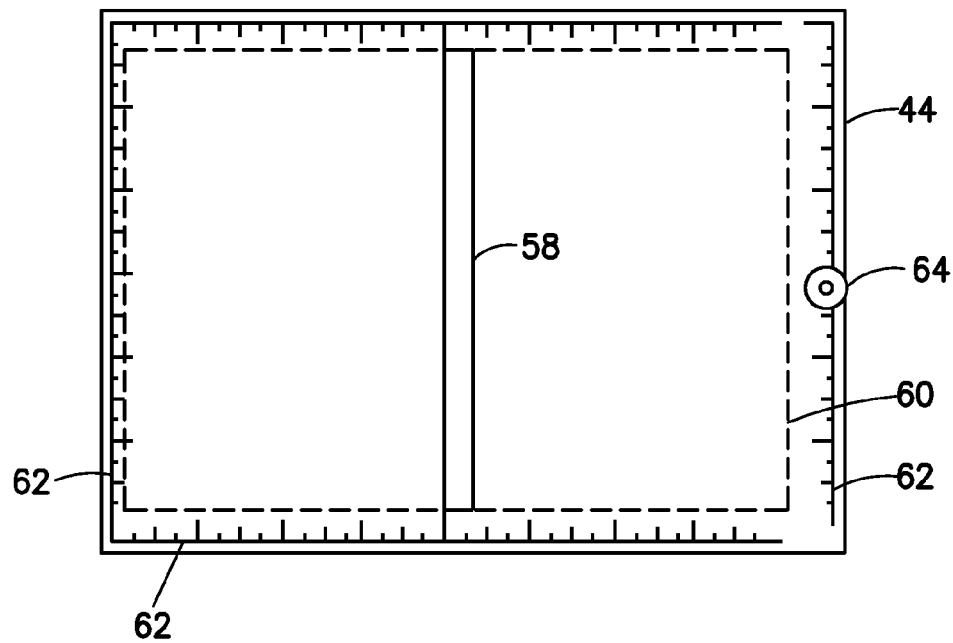
FIGS. 14A and 14B are schematic representations (top and side views respectively) of one embodiment of a portable mechanical maintenance cart which can be employed by maintenance personnel to measure a battery's weight and CG using various scales marked on the cart.
Figure 14B:
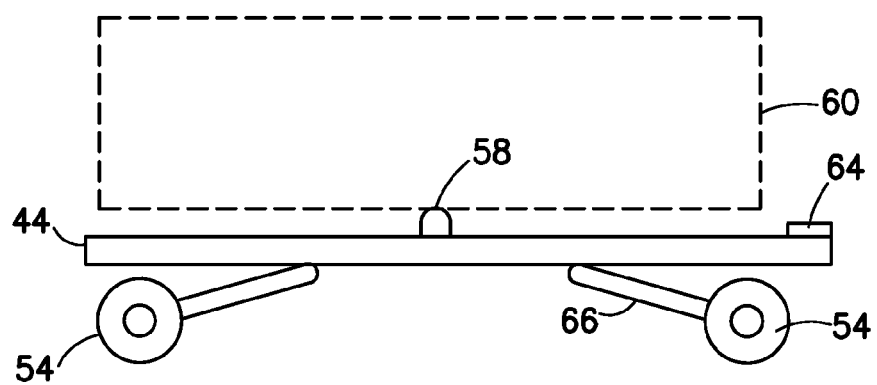

For cases when an electronic cart is too expensive in view of budgetary constraints, a mechanical cart can be employed. FIGS. 14A and 14B are schematic representations (top and side views respectively) of one embodiment of a portable mechanical maintenance cart which can be employed by maintenance personnel to measure a battery's weight and CG using various scales marked on the cart. The user balances the battery (not shown in FIGS. 14A and 14B, but the space occupied by the battery is indicated by dashed rectangles 60) on a fulcrum 58 to measure CG. Scales 62 (seen in FIG. 14A) marked in inches or centimeters are etched into the platform 44 to measure the battery's position when balanced at its CG. Two axes of CG can be measured with the battery resting on its normal bottom surface; three axes of CG can be measured if the user stands the battery on its end or side. A surveyor's level 64 attached to the platform 44 helps the user determine when the platform 44 is level so that CG measurements are valid. A vertical force sensor 66, e.g., a spring suspension with a marked deflection scale, measures the battery weight. In some embodiments, the fulcrum 58 can be raised high enough for the battery to balance at a non-horizontal angle. Mechanical marks (not shown) can be provided to help the user position the battery at known tilt angles. CGs measured at various tilt angles are used with plots, like the plot shown in FIG. 6, to assess battery health.

Figure 15A:
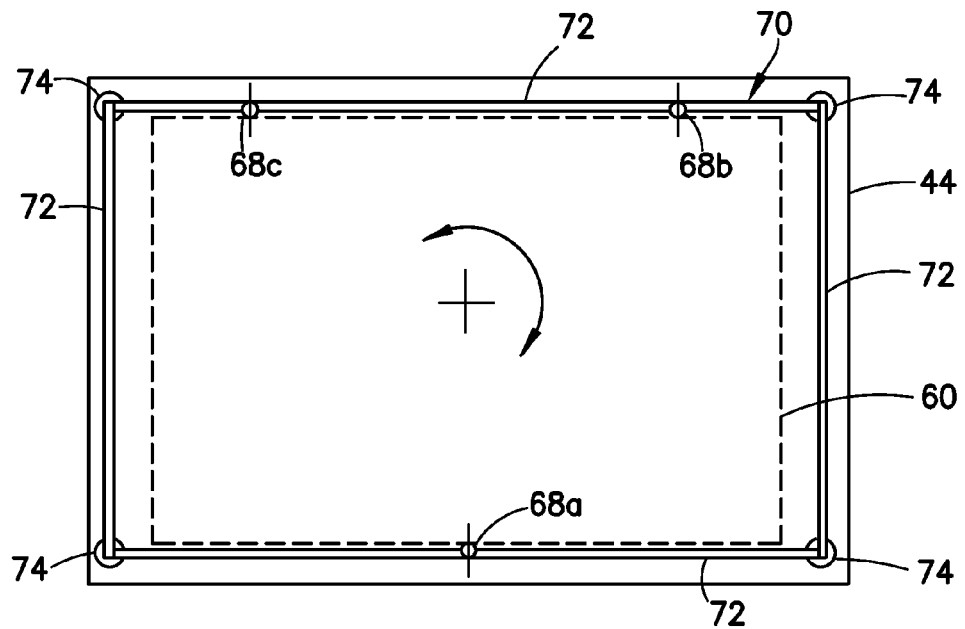
FIGS. 15A and 15B are schematic representations (top and side views respectively) of one embodiment of a portable maintenance cart which can be employed by maintenance personnel to measure moment of inertia by suspending a battery in a trifilar pendulum.
Figure 15B:
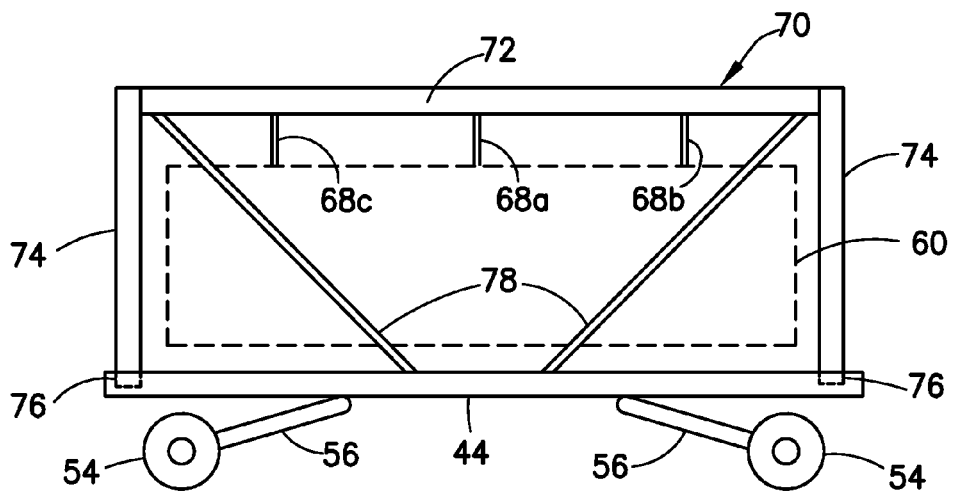

FIGS. 15A and 15B are schematic representations (top and side views respectively) of one embodiment of a portable maintenance cart which can be employed by maintenance personnel to measure moment of inertia by suspending a battery in a trifilar pendulum. This is a standard means of measuring moment of inertia. The cart includes a removable frame 70 comprising four cross-bars 72 that connect four posts 74 extending vertically at four corners of a rectangle. The frame 70 is secured in place by a multiplicity (e.g., eight) buttresses 78, each pair of buttresses 78 connecting a respective cross-bar 72 to the platform 44. The buttresses are also removable, e.g., a receptacle (not shown in FIG. 15B) could be provided in the cart platform for ach buttress. Other quick attachment/detachment methods include wing bolts or thumb bolts (not shown) placed through holes in the base of each buttress and into threaded holes in the cart platform. The posts 74 fit into respective receptacles 76 formed in the platform 44 after the battery has been placed on the platform 44. The battery is then hoisted up (into position 60 shown in FIG. 15B) so that its weight is carried by the three fibers 68a, 68b and 68c of the trifilar pendulum. The user then twists the battery to induce weak torsional oscillation. The period of oscillation indicates the moment of inertia, using calculations well-known in the art. Hall effect proximity sensors or optical position encoders could be used to measure the pendulum's angular position. The sensor would connect to a processor that measures the period, e.g., an analog timer to measure the interval at which the pendulum returns to the same position (this could even be a person with a stop watch) or a digital processor computing a Fourier transform of the position versus time and choosing the frequency with the highest amplitude.

In accordance with an alternative embodiment, the frame is taller and the system for attaching the battery to the fibers allows the battery to be hung in a non-horizontal orientation. This embodiment can measure moments of inertia about non-vertical axes.

Figure 16A:
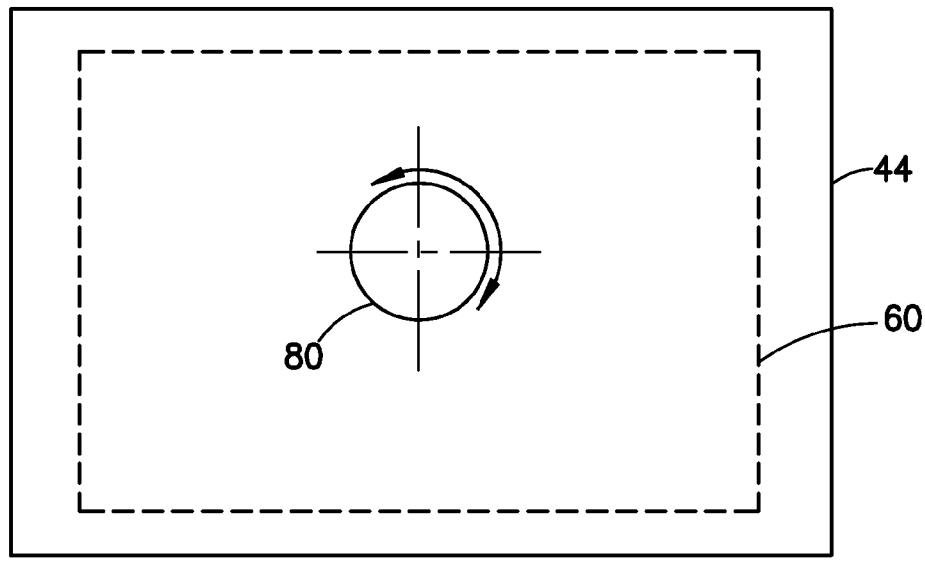
FIGS. 16A and 16B are schematic representations (top and side views respectively) of one embodiment of a portable maintenance cart equipped to mechanically measure moments of inertia about a vertical axis.
Figure 16B:
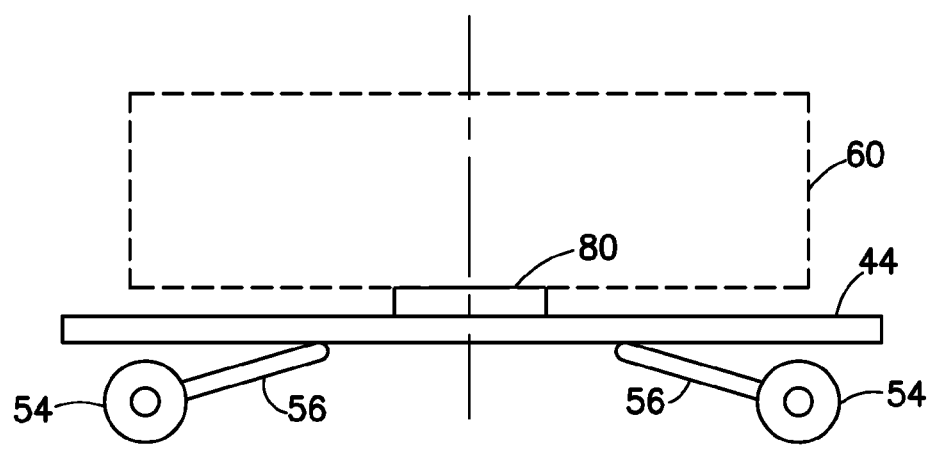

FIGS. 16A and 16B are schematic representations (top and side views respectively) of one embodiment of a portable maintenance cart equipped to mechanically measure moments of inertia about a vertical axis. This platform 44 has a turntable 80 rotatably mounted thereto with a torsion spring to provide torsional oscillation. The rotational motion of the turntable 80 about a vertical axis is indicated by the double-headed curved arrow and the vertical axis is indicated by the intersection of two mutually perpendicular dash-dot lines seen in FIG. 16A. The moment of inertia I about that vertical axis is given by the well-known formula:

$$I = \frac{\kappa}{(2\pi f)^2} \qquad (21)$$

where κ is the spring's torsional constant and f is the oscillation frequency. The oscillation frequency f may be measured electronically (using the techniques for measuring the period of oscillation described above), or the user may count the number of oscillations in a given interval of time.

The user may insert a wedge (not shown) to tilt the battery as it sits on the turntable 80. This allows measurement of moments of inertia about a non-vertical axis through the battery. Alternatively, the cart may be parked on a tilted surface. Then the instrument measures moment of inertia about the battery's "vertical" axis, but liquids in the cells will be tilted, shifting their centers of mass relative to the axis.

Each of the carts described herein goes into the plane with the maintenance personnel. It is used to move the battery into and out of the plane, as the main battery for a large airplane is too heavy for people to carry more than a few feet. The battery is typically installed in a rack that is in the Electrical Equipment (EE) bay of an airplane. There is accessible floor space for workers in front of the rack. If the health of a battery cannot be assessed while the battery remains in the rack, then that battery will be pulled out and worked on in the accessible space in the EE bay. This is cheaper than moving the battery all the way out of the airplane and into a laboratory or depot. The cart fits in the accessible space. If the battery tests performed on the cart show that the battery is healthy, the battery is returned to the rack. If not, then the battery is already on the cart that the workers use to remove it from the airplane.

While battery health management methodologies have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The method claims set forth hereinafter should not be construed to require that the steps recited therein be performed in alphabetical order (alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method comprising:
   (a) measuring a weight of a battery;
   (b) calculating a difference of the measured weight and a nominal weight characteristic of the healthy battery of the same class as the battery whose health is being assessed;
   (c) if the difference of the measured weight and the nominal weight is greater than a specified tolerance, measuring a location of a center of gravity of the battery in a first dimension; and
   (d) calculating a location where a weight change occurred using the difference of the measured weight and the nominal weight and the measured center of gravity.

2. The method as recited in claim 1, wherein the location of the center of gravity of the battery is also measured in a second dimension.

3. The method as recited in claim 1, further comprising testing a cell closest to the location within an area where the weight change occurred.

4. The method as recited in claim 1, further comprising replacing a cell closest to the location where the weight change occurred.

5. A method comprising:
   (a) measuring a first location of a first center of gravity of a battery in a first dimension when the battery has a first orientation;
   (b) tilting the battery from the first orientation to a second orientation different than the first orientation;
   (c) measuring a second location of a second center of gravity of the battery in the first dimension when the battery has the second orientation; and
   (d) calculating a center of gravity shift in the first dimension based on the first and second locations.

6. The method as recited in claim 5, wherein the first and second locations are also measured in a second dimension.

7. The method as recited in claim 5, further comprising:
   calculating a state of charge of the battery;
   calculating a difference of the calculated center of gravity shift and a nominal center of gravity shift characteristic of a healthy battery of the same class and having a state of charge in the same range as the battery whose health is being assessed; and
   if the difference of the calculated center of gravity shift and the nominal center of gravity shift is greater than a specified tolerance, conducting further tests to locate a flawed cell inside the battery.

8. A method comprising:
   (a) measuring a first moment of inertia of a battery about a first axis when the battery has a first orientation;

(b) calculating a state of charge of the battery;
(c) calculating a difference of the measured moment of inertia and a nominal moment of inertia characteristic of a healthy battery of the same class and having a state of charge in the same range as the battery whose health is being assessed; and
(d) if the difference of the measured moment of inertia and the nominal moment of inertia is greater than a first specified tolerance, conducting further tests.

9. The method as recited in claim 8, wherein step (d) comprises:
(e) tilting the battery from the first orientation to a second orientation different than the first orientation;
(f) measuring a second moment of inertia of the battery about the first axis when the battery has the second orientation;
(g) calculating a difference of the first and second moments of inertia; and
(h) if the difference of the calculated difference of the first and second moments of inertia and a nominal difference of the first and second moments of inertia is greater than a second specified tolerance, conducting further tests.

10. The method as recited in claim 9, wherein step (h) comprises repeating steps (a), (e), (f) and (g) using a second axis instead of the first axis.

11. A system to assess the health of a battery, comprising a battery, at least three non-collinear vertical force sensors supporting said battery, and a processor in communication with said vertical force sensors, said processor being programmed to use data from said vertical force sensors to compute a center of gravity of said battery.

12. The system as recited in claim 11, further comprising a platform and a tilt sensor mounted to said platform and in communication with said processor, wherein said tilt sensor is capable of measuring a tilt angle of said platform, and said vertical force sensors are disposed in a plane on said platform.

13. The system as recited in claim 12, further comprising a plurality of wheels and a suspension system for coupling said wheels to said platform.

14. The system as recited in claim 11, further comprising an accelerometer or an inertial measurement unit in communication with said processor, wherein said processor is further programmed to use data from said vertical force sensors and said accelerometer or inertial measurement unit to compute a moment of inertia of said battery.

15. A cart comprising a platform, a plurality of wheels, a suspension system that couples said wheels to said platform, a frame mounted to said platform, a pendulum supported by said frame, and a battery supported by said pendulum.

16. The cart as recited in claim 15, wherein said pendulum is a torsion pendulum.

17. The cart as recited in claim 15, wherein said pendulum is a trifilar pendulum.

18. A method comprising the following steps:
(a) establishing a nominal relationship of a free volume of liquid electrolyte versus a state of charge for a class of battery cells;
(b) establishing a nominal weight for battery cells of that class;
(c) weighing an in-service battery cell of that class;
(d) determining a first difference between said weight and said nominal weight;
(e) comparing said difference to a first specified threshold;
(f) determining whether said difference is greater than said first specified threshold or not;
(g) if said difference is greater than said first specified threshold, removing said in-service cell permanently; or
if said difference is not greater than said first specified threshold, performing the following additional steps:
(h) measuring a state of charge of said in-service battery cell;
(i) determining a nominal free volume of liquid electrolyte according to said nominal relationship and said measured state of charge;
(j) measuring a cell property having a value that varies as a function of a free volume of liquid electrolyte inside said in-service battery cell;
(k) computing an estimated free volume of liquid electrolyte inside said in-service battery cell based on measurement of said cell property;
(l) determining a difference between said estimated free volume and said nominal free volume of liquid electrolyte;
(m) comparing said difference between said estimated free volume and said nominal free volume to a second specified threshold; and
(n) if said difference between said estimated free volume and said nominal free volume is greater than a second specified threshold, removing said in-service battery cell permanently or until further tests can be performed.

19. The method as recited in claim 18, wherein said cell property is center of gravity or moment of inertia.

* * * * *